United States Patent [19]
Neary

[11] Patent Number: 5,526,889
[45] Date of Patent: Jun. 18, 1996

[54] DRIVE FOR ALL-TERRAIN VEHICLE

[76] Inventor: J. Robert Neary, 32 Academy St., Kentville, Nova Scotia, Canada, B4N 1S4

[21] Appl. No.: 388,078

[22] Filed: Feb. 14, 1995

[30] Foreign Application Priority Data

Feb. 18, 1994 [CA] Canada .................................. 2115958

[51] Int. Cl.⁶ ...................................................... F16H 9/04
[52] U.S. Cl. ...................... 180/6.66; 180/19.1; 180/19.3; 180/908; 474/1
[58] Field of Search ................................. 180/6.66, 19.1, 180/19.2, 19.3, 22, 908; 474/1

[56] References Cited

U.S. PATENT DOCUMENTS

| | | | |
|---|---|---|---|
| 1,007,957 | 11/1911 | McCausland | 474/1 |
| 1,736,627 | 11/1929 | Ryalls . | |
| 2,780,107 | 2/1957 | Sorrell . | |
| 2,909,232 | 10/1959 | Cataline et al. | 180/19.1 |
| 3,145,584 | 8/1964 | Fairbank et al. . | |
| 3,375,740 | 4/1968 | Bottum . | |
| 3,498,398 | 3/1970 | Burrough et al. . | |
| 4,673,377 | 6/1987 | Akutagawa . | |

FOREIGN PATENT DOCUMENTS

| | | |
|---|---|---|
| 75470 | 10/1917 | Germany . |
| 1284784 | 12/1968 | Germany . |

*Primary Examiner*—Mitchell J. Hill
*Attorney, Agent, or Firm*—Barrigar & Moss

[57] ABSTRACT

A reversing drive or transmission is shown which is particularly useful for all-terrain vehicles. The drive includes a drive shaft and an intermediate axle spaced therefrom. The drive shaft and intermediate axle have respective pulley and drum assemblies mounted thereon in registration, with a V-belt coupling the drive and driven pulleys. A swing arm moves the intermediate axle toward and away from the drive shaft to tension the V-belt or alternatively engage the drive wheels for reverse rotation of the intermediate axle. An intermediate sprocket mounted on the intermediate axle drives a driven sprocket co-axially mounted on the pivot axis of the swing arm. The plane of rotation of the intermediate sprocket is transversely orientated with respect to the swing arm pivot axis, so that torsional forces on the intermediate sprocket tend to reinforce the engagement between the respective pulley and drum assemblies in the forward and reverse directions.

20 Claims, 5 Drawing Sheets

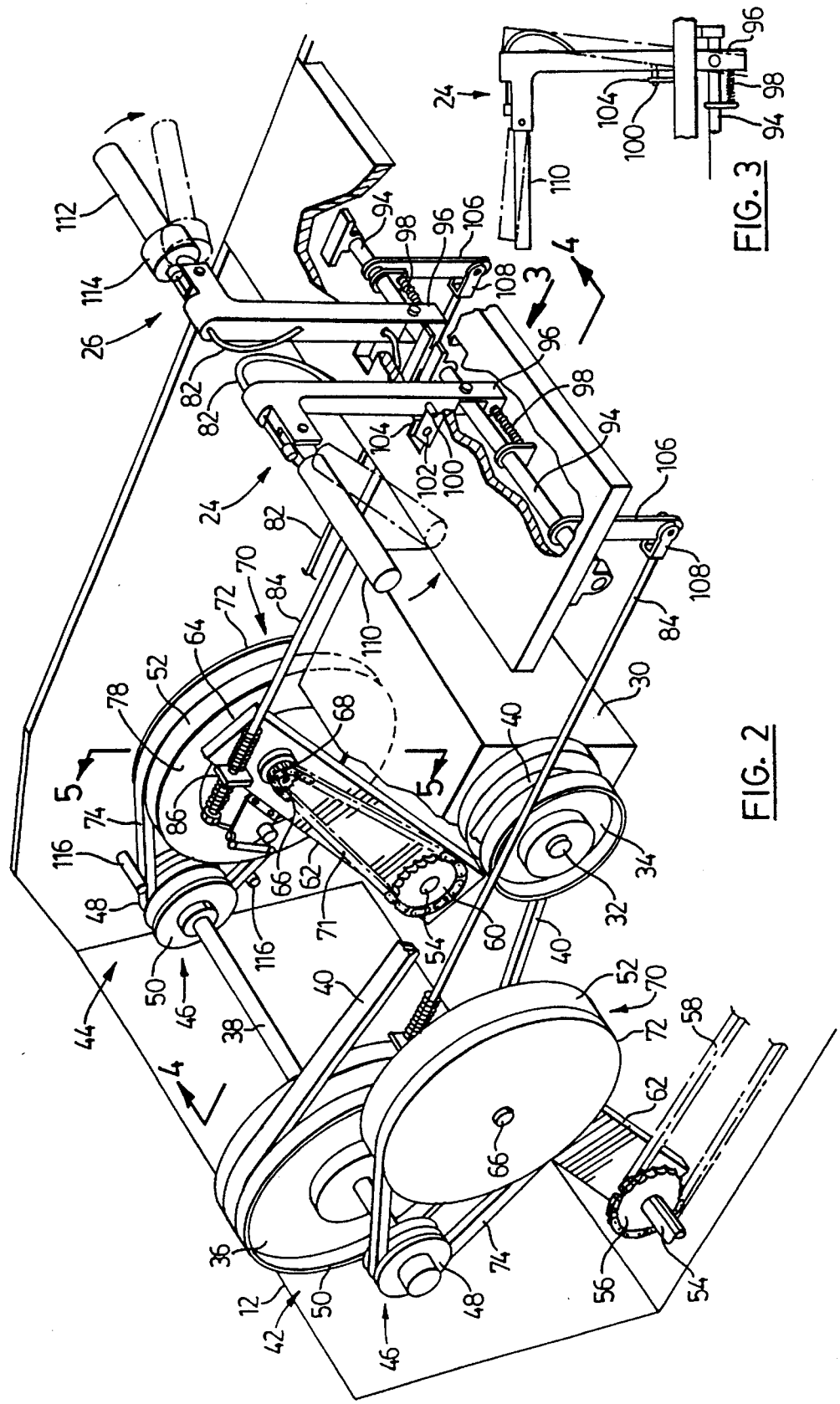

DRIVE FOR ALL-TERRAIN VEHICLE

BACKGROUND OF THE INVENTION

This invention relates to a reversing drive or transmission for a small vehicle, such as an all-terrain vehicle, a golf cart or a snowmobile.

DESCRIPTION OF THE PRIOR ART

It is common in small vehicles to have a small engine or electric motor to provide motive power through a variable speed centrifugal clutch or torque converter of the type having variable diameter drive and driven pulleys. For example, as the engine speed increases the diameter of the drive pulley increases and the diameter of the driven pulley decreases thereby increasing the speed of rotation of the driven pulley. The output of the driven pulley is usually mounted on a drive shaft, and a transmission often couples the drive shaft to the vehicle wheels to turn the latter and propel the vehicle.

The rotation of the drive shafts in these vehicles is usually in one direction only, because the rotation of the small engines or motors and the variable speed torque converters coupling them to the drive shaft is uni-directional. A reversing drive or transmission is therefore needed to couple the output of the drive shaft to the wheels, so that the vehicle can move in forward or reverse as desired. In the case of an all-terrain vehicle, there are usually separate drives for the wheels on either side of the vehicle allowing the all-terrain vehicle to be steered by changing the speed or direction of rotation of the wheels on either side of the vehicle.

One common method of making a reversing drive or transmission is to provide a gear train or a series of frictionally engaged drive wheels wherein the number of gears in the train or the number of wheels engaged changes. A difficulty with this type of arrangement, however, is that a very complicated arrangement is usually required to change the number of gears or drive wheels in the train without damage.

Another type of reversing drive is shown in U.S. Pat. No. 2,780,107 issued to R. A. Sorrell. In this patent, a V-belt drive and a pair of friction wheels are mounted in parallel, and depending on whether or not the V-belt drive or the friction wheels is engaged, the rotation of the output from this combination reverses. A difficulty with this type of arrangement, however, is that the V-belt pulleys or the friction wheels tend to disengage by the natural forces between them. Some type of cam arrangement is required to maintain them in effective engagement and, of course, this is subject to failure or a degradation in performance as a result of wear between the mating components.

SUMMARY OF THE INVENTION

The present invention is an alternate V-belt/friction wheel type reversing drive, but the torque from the rotational output of this drive is used to augment or increase the engagement and compensate for wear between the driving and driven components.

According to one aspect of the invention, there is provided a reversing drive comprising a drive shaft having a drive wheel assembly mounted thereon including a drive pulley and an adjacent drive wheel. An intermediate axle is spaced from the drive shaft and has a reversing wheel assembly mounted thereon to turn therewith. The reversing wheel assembly includes a driven pulley located in registration with the drive pulley and then adjacent driven drum located in registration with the drive wheel. A V-belt couples the drive and driven pulleys. A swing arm has means for rotationally mounting the intermediate axle. A pivot shaft is adapted to support the swing arm to pivot about a pivot axis spaced from the intermediate axle. Means is provided for pivoting the swing arm whereby the reversing wheel assembly moves between a first position wherein the V-belt is tensioned between the drive and driven pulleys and the drive wheel and driven drum are disengaged, and a second position wherein the V-belt is loose and the drive wheel and driven drum are engaged. An intermediate rotational drive member has a central axis of rotation and is coupled to the intermediate axle to turn therewith. The intermediate drive member is adapted to rotate in a plane perpendicular to its central axis. This plane is located so that torsional forces on the intermediate drive member tend to rotate the swing arm. Also, a rotational driven member is provided, with the intermediate drive member being operably connected thereto to turn the rotational driven member.

According to another aspect of the invention, there is provided a reversing drive comprising a main axle having a driven sprocket mounted thereon to turn the axle. A swing arm is pivotally mounted on the main axle adjacent to the driven sprocket, the spring arm having a distal end portion remote from the drive sprocket. An intermediate axle is rotatably mounted on the swing arm distal end portion. An intermediate sprocket is mounted on the intermediate axle in registration with the driven sprocket. A drive chain rotatably couples the driven and intermediate sprockets. A reversing wheel assembly is mounted to turn with the intermediate axle, this assembly having a driven pulley and an adjacent drive drum. A drive shaft having a drive wheel assembly mounted thereon is spaced from the intermediate axle. The drive wheel assembly has a drive pulley located in registration with the driven pulley and an adjacent drive wheel in registration with the driven drum. A V-belt couples the drive and driven pulleys. Also, means is provided for moving the drive wheel assembly and the reversing wheel assembly toward and away from each other between a first position wherein the V-belt is tensioned between the drive and driven pulleys and the drive wheel and driven drum are disengaged, and a second position wherein the V-belt is loose and the drive wheel and driven drum are engaged.

According to yet another aspect of the invention, there is provided an all-terrain vehicle comprising an elongate chassis having parallel, spaced-apart sides. A plurality of wheels are mounted on each side of the vehicle. Means operably connects the wheels on each side of the vehicle for simultaneous rotation thereof. A reversing drive as defined above is operably coupled to one of the wheels on each side of the vehicle, and a variable speed power source is connected to the drive shaft of each reversing drive.

BRIEF DESCRIPTION OF THE DRAWINGS:

Preferred embodiments of the invention will now be described, by way of example, with reference to the accompanying drawings, in which:

FIG. 2 is a perspective view, partly broken away, of a preferred embodiment of a reversing drive according to the present invention;

FIG. 3 is an elevational view of one of the control handles as view, in the direction of arrow 3 of FIG. 2;

DESCRIPTION OF THE PREFERRED EMBODIMENTS

Figure 1:
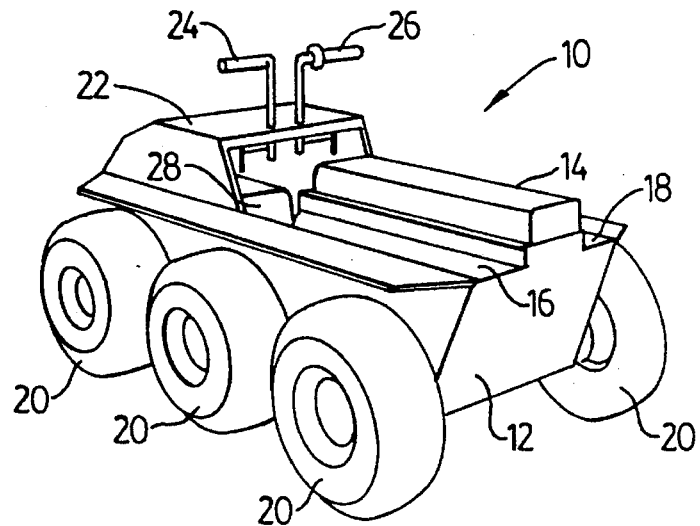
FIG. 1 is a perspective view of a preferred embodiment of an all-terrain vehicle according to the present invention.
Figure 5:
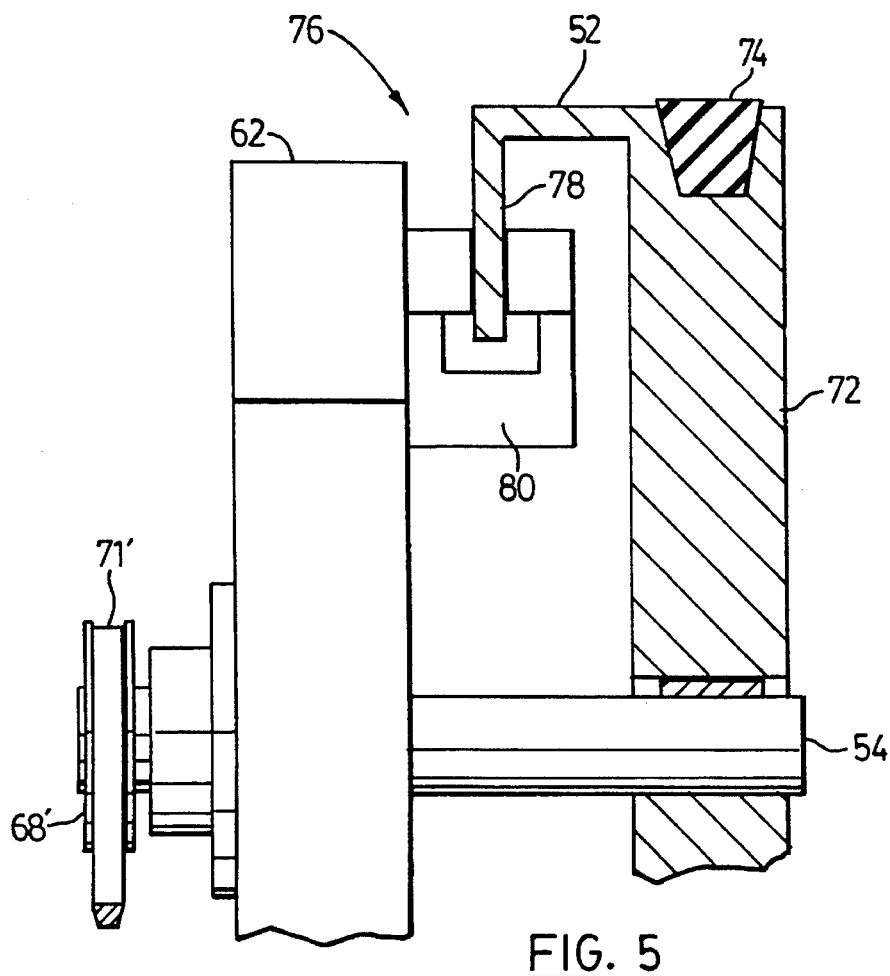
FIG. 5 is an elevational view, partly broken away, taken along lines 5—5 of FIG. 2.

Referring firstly to FIG. 1, a preferred embodiment of an all-terrain vehicle employing a preferred embodiment of the drive of the present invention is generally indicated by reference numeral 10. Vehicle 10 includes a shell or body 12 which is watertight like the hull of a boat, so that vehicle 10 will float on water. Body 12 includes an elongate seat 14 which hingeably covers a storage locker located between a pair of elongate wells 16, 18 for a person's legs sitting straddling seat 14. Two persons can ride in vehicle 10 in tandem, but more persons can be accommodated depending upon the length of seat 14. Three wheels 20 are located on each side of body 12. The wheels on each side of body 12 are linked together to turn simultaneously as will be described further below. A front cowl 22 is mounted on the forward end of body 12, and two of control handles 24, 26 are pivotally mounted on cowl 22. An engine and drive housing 28 is located below cowl 22 to contain the engine and drive of vehicle 10, as is described next below.

Referring next to FIG. 2, which is a view looking toward the front of vehicle 10 with cowl 22, drive housing 28, and the left side of body 12 removed for the purposes of illustration. An engine 30 is shown diagrammatically, mounted in body 12. Engine 30 could be a small gasoline engine or an electric motor, and in the latter case, batteries (not shown) would be provided as a power source for the motor. Engine 30 has an output shaft 32 and a drive sheave 34 is mounted thereon. A driven sheave 36 is mounted on a main drive shaft 38. Driven sheave 36 and drive sheave 34 are in registration and coupled together by a drive belt 40, so that rotation of drive sheave 34 causes driven sheave 36, and in turn main drive shaft 38, to rotate. Sheaves 34, 36 and belt 40 form a torque converter or variable speed drive. Sheave 34 has a centrifugal clutch or equivalent mechanism built into it, so that as the speed of rotation of engine output shaft 32 increases, the effective diameter of sheave 34 increases. This causes the effective diameter of driven sheave 36 to decrease resulting in an increase in the speed of rotation of main drive shaft 38. Sheaves 34, 36 are spring loaded, so that as engine 30 slows down, the effective diameters of sheaves 34, respectfully decrease and increase, causing the speed of main drive shaft 38 to slow down accordingly. Also, as the torque on drive sheave 34 increases, its diameter decreases to reduce the effective "gear" ratio of sheaves 34, 36 and slow down main drive shaft 38. Engine 30 and the torque converter formed by sheaves 34, 36 and belt 40 are conventional and are not considered to be essential to the present invention, so will not be described in further detail.

Two reversing drives 42 and 44 are employed in all-terrain vehicle 10, one to power each set of wheels 20 on either side of vehicle 10. Each of the reversing drives 42 and 44 is powered by the common drive shaft 38. Each of the reversing drives 42, 44 has a drive wheel assembly 46 mounted thereon to turn with drive shaft 38. Each drive wheel assembly 46 includes a drive pulley 48 and an adjacent drive wheel 50. Drive wheels 50 have a resilient tread or coating for frictional engagement with driven drums 52 as described further below.

The forward wheel of each set of wheels 20 is mounted on a main axle 54, so that rotation of axles 54 turn the forward wheels 20. A wheel linking sprocket 56 is mounted on each axle 54 and is coupled to similar sprockets on the axles of the two other wheels on each side of vehicle 10 by drive chains 58, so that all three wheels 20 on each side of vehicle 10 turn simultaneously upon rotation of each axle 54. A driven sprocket 60 is mounted on the inside end of each main axle 54 to turn axle 54.

A swing arm 62 is pivotally mounted on each main axle 54 adjacent to driven sprocket 60. Each swing arm 62 has a distal end portion 64 remote from driven sprocket 60. An intermediate axle 66 is rotatably mounted in each swing arm distal end portion 64, and an intermediate sprocket 68 is mounted on each intermediate axle 66 in registration with its respective driven sprocket 60. A drive chain 71 rotatably couples the driven and intermediate sprockets 60, 68. Main axle 54 is a pivot shaft for swing arm 62 to pivot in a plane perpendicular to main axle 54.

A reversing wheel assembly 70 is mounted on each intermediate axle 66 to turn therewith. Each reversing wheel assembly 70 includes a driven pulley 72 and an adjacent drive drum 52. A V-belt 74 couples each driven pulley 72 with its respective drive pulley 48.

As seen best in FIGS. 4a through 4c and FIG. 5, a disc brake 76 is provided for each reversing drive 42, 44. The disc brakes 76 include an annular disc 78 attached to driven drum 52 and a brake calliper 80 attached to swing arm 62. A control rod or brake cable 82 is operably connected between each brake calliper 80 and the respective control handle 24 or 26 associated with the respective reversing drive 42 or 44.

Figure 4A:
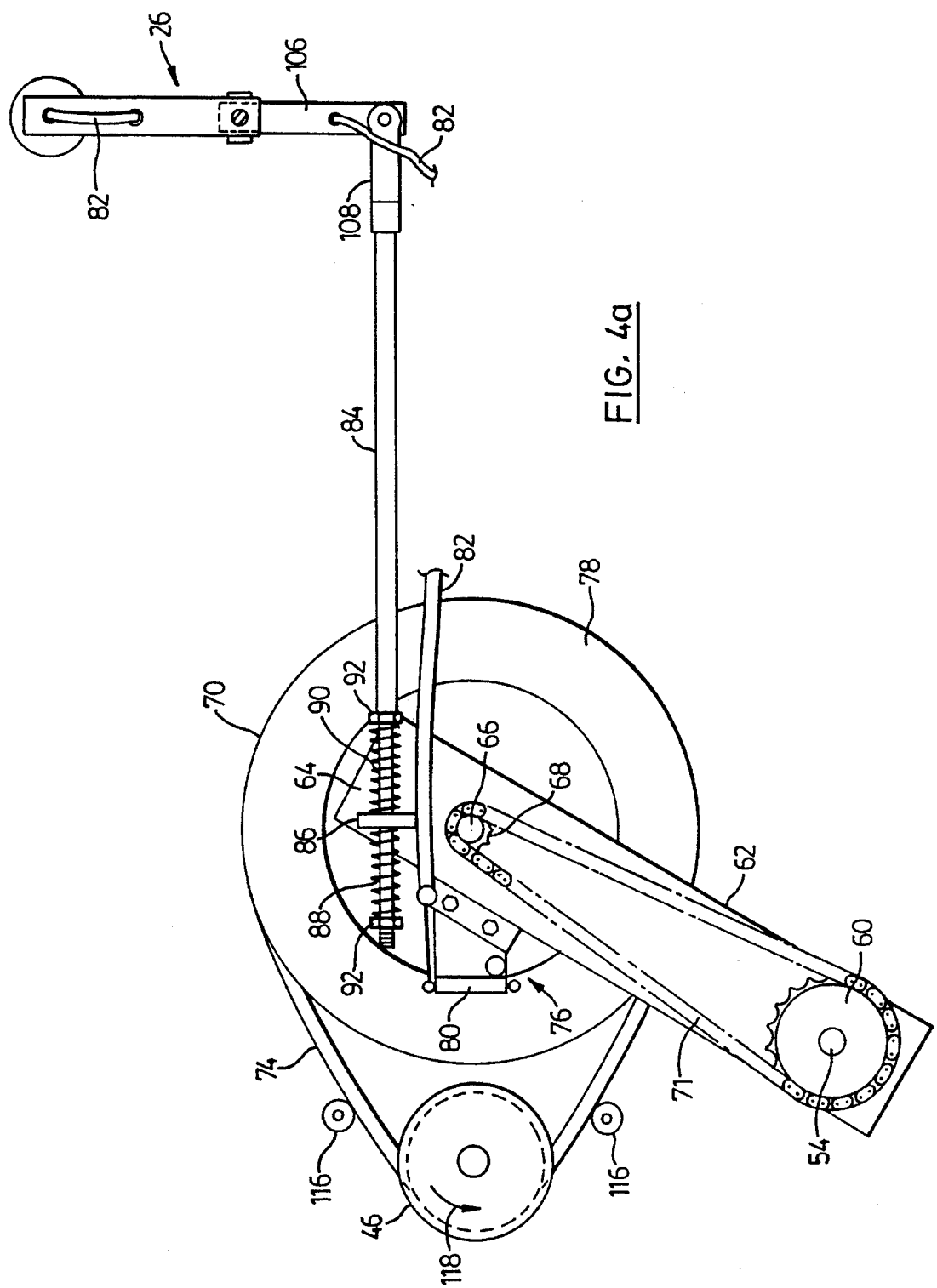
FIG. 4a is a partial elevational view taken along lines 4—4 of FIG. 2 showing the drive in the neutral position.
Figure 4B:
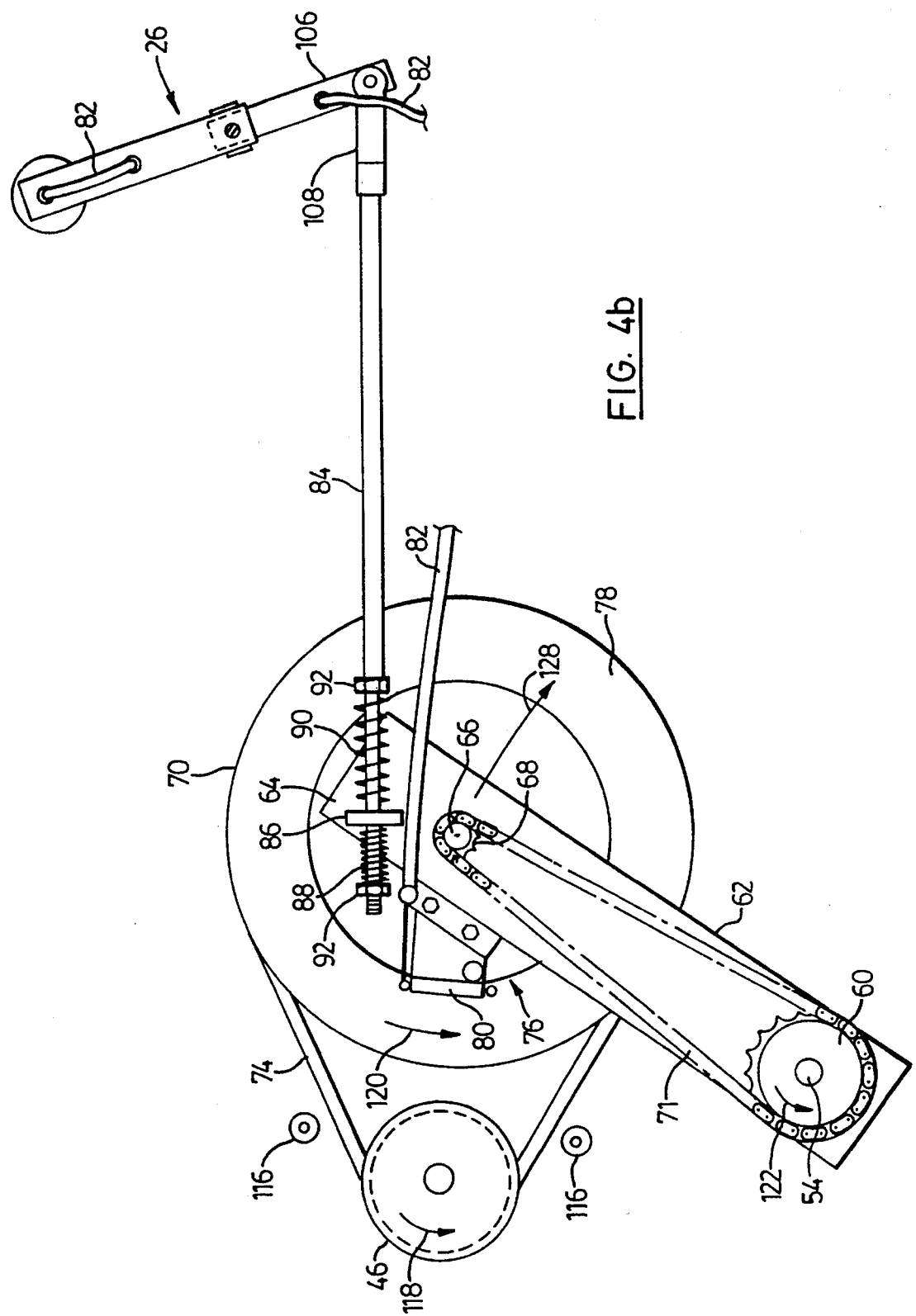
FIG. 4b is a partial elevational view taken along lines 4—4 of FIG. 2 showing the drive in the forward position.
Figure 4C:
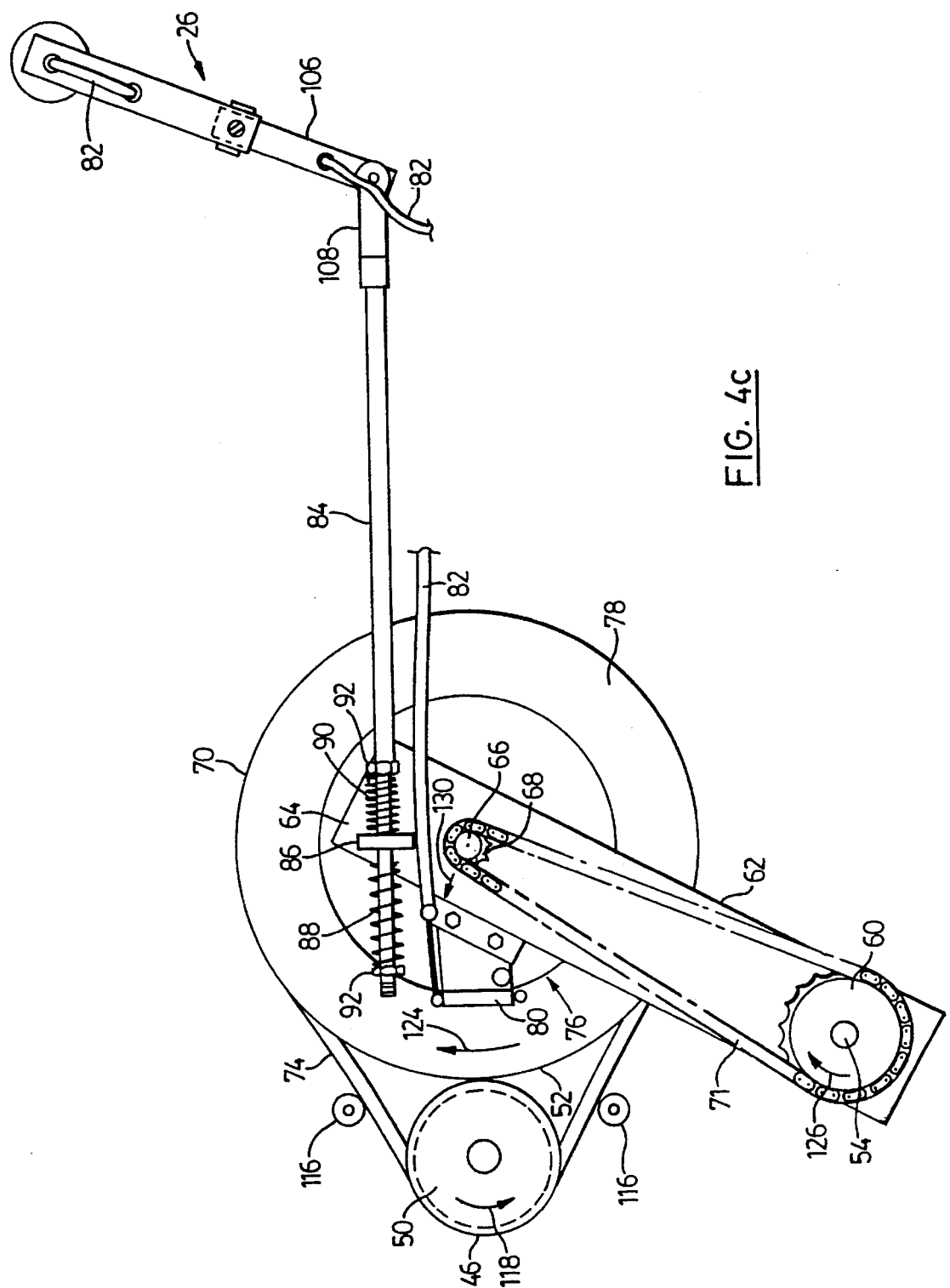
FIG. 4c is a partial elevational view taken along lines 4—4 of FIG. 2 showing the drive in the reverse position.

Means is provided for moving the drive wheel assembly 46 and the reversing wheel assembly 70 toward and away from each other between a first position as shown in FIG. 4b, a neutral position as shown in FIG. 4a, and a second position as shown in FIG. 4c. In the first position shown in FIG. 4b, V-belt 74 is tensioned between drive and driven pulleys 48, 72 and the drive wheel 50 and driven drum 52 are disengaged. In the second position as shown in FIG. 4c, V-belt 74 is loose, and the drive wheel 50 and driven drum 52 are engaged. In the neutral position shown in FIG. 4a, V-belt 74 is loose, and drive wheel 50 and driven drum 52 are also disengaged. In the preferred embodiment, these three positions are taken up by pivoting swing arm 62 about main axle 54 using a shift rod 84 operably connected to the distal end portion 64 of swing arm 62. This connection is made by a bracket 86 attached to the distal end portion 64 of swing arm 62 with shift rod 84 passing through bracket 86. Back-to-back compression or coil springs 88, 90 mounted on shift rod 84 by threaded fasteners 92 urge swing arm 62 into the first and second positions as illustrated in FIGS. 4b and 4c, and as discussed further below.

Referring in particular to FIGS. 2 and 3, control handles 24, 26 are mounted to pivot both longitudinally and transversely by being mounted on rotatable shafts 94 by transverse pins 96. Springs 98 urge handles 24, 26 into the upright position, and pins 100 located in holes 102 in brackets 104 retain handles 24, 26 in the three positions shown in FIGS. 4a, 4b and 4c. These positions are changed by swinging handles 24, 26 transversely or inwardly as indicated in chain-dotted lines in FIG. 3 and moving handles 24, 26 forward or back allowing pin 100 to enter one of the holes 102 in the desired position. Pivoting handles 24, 26 longitudinally or forward and back causes a bracket 106 attached to shaft 94 to rotate or move longitudinally. A clevis 108 couples shift rod 84 to bracket 106.

Control handles 24, 26 include hand grips 110, 112 which are pivotally mounted to move up and down as indicated in chain-dotted lines in FIG. 2. Brake cables 82 are attached to the upper inner portions of hand grips 110, 112, so that when the hand grips are pivoted downwardly, brake cables 82 are retracted causing disc brakes 76 to be applied. In view of this, hand grips 110, 112 are also brake levers, but separate brake levers could be used with fixed hand grips 110, 112, as desired. Hand grip 112 also has a throttle cable 114 incorporated therein as in a typical motorcycle hand grip, and this throttle cable (not shown) is connected to engine 30 to control the speed of the engine in a conventional manner.

Referring again to FIG. 5, an alternative embodiment is shown for intermediate sprocket 68 and drive chain 71 wherein these items are in the form of an intermediate pulley 68' and a V-belt 71'.

In operation, vehicle 10 is started with the control handles 24, 26 in the upright, or centre, or neutral position as illustrated in FIG. 4a. In this position, V-belt 74 is loose, so it does not transmit any rotational force from drive pulley 48 to driven pulley 72. Guide rollers 116 are provided to keep V-belt 74 in the grooves of pulleys 48, 72 when there is no tension in V-belt 74. As the speed of engine 30 is increased from idle, drive sheave 34 causes driven sheave 36 to rotate, which in turn rotates drive shaft 38 and drive wheel assembly 46. Drive wheel assembly 46 always rotates in the same direction as indicated by arrows 118 in FIGS. 4a, 4b and 4c. To move vehicle 10 forward in a straight line, both control handles 24, 26 are pivoted inwardly and moved forwardly to a first or forward position as indicated in FIG. 4b. This pivots swing arm 62 rearwardly causing spring 88 to be compressed and tensions V-belt 74 resulting in reversing wheel assembly 70 being rotated in the direction indicated by arrow 120 in FIG. 4b. This in turn causes intermediate sprocket 68 to rotate, and through chain 71 driven sprocket 60 rotates in the direction of arrow 122. This causes main axles 54 to rotate turning wheels 20 in the forward direction.

If it is desired to move vehicle 10 in the reverse direction in a straight line, control handles 24, 26 are pivoted inwardly and moved rearwardly to the position shown in FIG. 4c. This causes springs 90 to be compressed urging drive drums 52 into engagement with drive wheels 50, causing reversing wheel assemblies 70 to rotate in the direction of arrow 124 in FIG. 4c. This in turn causes driven sprocket 60 to rotate in the direction of arrow 126 causing wheels 20 to rotate in the reverse direction.

There are two ways to steer vehicle 10. First, control handles 24, 26 can be manipulated so that they are in different positions. For example, to steer vehicle 10 to the left control handle 26 could be put into the forward position, and control handle 24 could be left in the neutral position or put into the reverse position as indicated in FIG. 4c. Similarly, to steer vehicle 10 to the right, control handle 24 could be put into the first or forward position, and control handle 26 could be left in the neutral position or put into the reverse position as indicated in FIGS. 4a and 4c.

The second way to steer vehicle 10, if it is moving, is simply to apply one of the disc brakes 76. This slows down the wheels 20 on the side of the vehicle on which brake 76 is applied, causing the vehicle to turn to the right or the left, depending upon whether the right or the left brake is applied.

Applying the brakes in this fashion also causes reversing drives 42, 44 to be disengaged automatically, like an automatic clutch, as will be described next below.

Referring, for example, to FIG. 4b, where the vehicle is moving forward, it will be noted that the plane of rotation of intermediate sprocket 68 is parallel to the plane in which swing arm 62 pivots. Further, the pivot axis of pivot shaft or main axle 54 is perpendicular to the plane of rotation of intermediate sprocket 68 and also spaced from the axis or axle of intermediate sprocket 68. This causes a torque to be applied to swing arm 62 tending to move it in the direction of arrow 128 increasing the tension in V-belt 74. Similarly, when the reversing drives are in the reverse or second position as indicated in FIG. 4c, a torque is applied to swing arm 62 in the direction of arrow 130 causing an increase in the contact pressure between drive wheel 50 and driven drum 52. As long as the axis of pivot shaft or main axle 54 is located so that it is not in the plane of rotation of intermediate drive member 66, some desirable torsional force will be effected on swing arm 62. Preferably, the pivot shaft axis of main axle 54 is parallel to the intermediate drive member central axis of rotation, which is the axis of intermediate axle 66.

Now, it will be noted that brakes 76 are mounted on the side of swing arms 62 adjacent or nearest to drive wheel assembly 46. The result of this is that when the brakes 76 are applied, a torsional force is created which tends to pivot swing arm 62 in a direction that disengages drive wheel assembly 46. For example, referring to FIG. 4b, when the vehicle is moving forward and brake 76 is applied, a torque is applied to swing arm 62 that tends to move it in a direction opposite to arrow 128 further compressing spring 88 and loosening V-belt 74 causing it to slip. Similarly, in FIG. 4c, when the vehicle is moving backward and brake 76 is applied, a torque is applied to swing arm 62 that tends to move it in a direction opposite to arrow 130 further compressing spring 90 and disengaging drive wheel 50 and driven drum 52. The result of these torsional effects is a sort of automatic clutch, so that it is not necessary to disengage reversing drives 42, 44 using handles 24, 26 to steer vehicle 10. Both control handles 24, 26 can be kept in the forward or reverse position and the vehicle steered, simply by applying the left or right brake 76 to steer the vehicle left or right, respectively. This works when the vehicle is moving in either the forward or reverse direction.

Having described preferred embodiments, it will be appreciated that various modifications may be made to the structures described above. For example, instead of back-to-back springs 88, 90, a single spring rigidly attached at respective ends to shift rod 84 and bracket 86 could be used. The sprockets and chains used in vehicle 10 could be replaced by pulleys and V-belts or possibly even gears. For the purposes of this disclosure, the term rotational drive member is intended to include sprockets, pulleys, gears and the like. It will also be appreciated by those skilled in the art that various chain and belt tensioning devices (other than for reversing drives 42, 44) would be employed in vehicle 10, but these have been omitted from the drawings for the purposes of clarity.

It will be apparent to those skilled in the art that in light of the foregoing disclosure, many alterations and modifications are possible in the practise of this invention without departing from the spirit or scope thereof. Accordingly, the scope of the invention is to be construed in accordance with the substance defined in the following claims.

What is claimed is:

1. A reversing drive comprising:

a drive shaft having a drive wheel assembly mounted thereon including a drive pulley and an adjacent drive wheel;

an intermediate axle spaced from the drive shaft and having a reversing wheel assembly mounted thereon to turn therewith, said reversing wheel assembly including a driven pulley located in registration with the drive pulley and an adjacent driven drum located in registration with the drive wheel;

a V-belt coupling the drive and driven pulleys;

a swing arm having means for rotationally mounting said intermediate axle;

a pivot shaft adapted to support the swing arm to pivot about a pivot axis spaced from the intermediate axle;

means for pivoting the swing arm whereby the reversing wheel assembly moves between a first position wherein the V-belt is tensioned between the drive and driven pulleys and the drive wheel and driven drum are disengaged, and a second position wherein the V-belt is loose and the drive wheel and driven drum are engaged;

an intermediate rotational drive member having a central axis of rotation and being coupled to the intermediate axle to turn therewith, said intermediate drive member being adapted to rotate in a plane perpendicular to its central axis, said plane being located so that torsional forces on the intermediate drive member tend to rotate the swing arm; and a rotational driven member, said intermediate drive member being operably connected thereto to turn the rotational driven member.

2. A reversing drive as claimed in claim 1 wherein the pivot shaft axis is located so that it is not in the plane of rotation of the intermediate drive member.

3. A reversing drive as claimed in claim 2 wherein the pivot shaft axis is parallel to the intermediate drive member central axis of rotation.

4. A reversing drive as claimed in claim 1 wherein the intermediate rotational drive member and the rotational driven member are sprockets, and further comprising a drive chain operably connecting said sprockets.

5. A reversing drive as claimed in claim 1 wherein the intermediate rotational drive member and the rotational driven member are pulleys, and further comprising a V-belt operably connecting said pulleys.

6. A reversing drive as claimed in claim 1 wherein the means for pivoting the swing arm is a shift rod operably connected to the distal end portion of the swing arm.

7. A reversing drive as claimed in claim 1 wherein the means for pivoting the swing arm is a shift rod operably connected to the distal end portion of the swing arm, and wherein said shift rod connection to the distal end portion of the swing arm includes a spring urging the swing arm into said first and second positions.

8. A reversing drive as claimed in claim 1 wherein the means for pivoting the swing arm is a shift rod operably connected to the distal end portion of the swing arm, and wherein said shift rod connection to the distal end portion of the swing arm includes a pair of back-to-back compression springs mounted on the shift rod, and further comprising a bracket located between the compression springs and attached to said distal end portion.

9. A reversing drive as claimed in claim 1 and further comprising a brake mounted on the swing arm to engage the reversing wheel assembly.

10. A reversing drive as claimed in claim 1 and further comprising a brake mounted on the swing arm to engage the wheel assembly on the side of the swing arm adjacent to the drive wheel assembly.

11. A reversing drive comprising:

a main axle having a driven sprocket mounted thereon to turn said axle;

a swing arm pivotally mounted on the main axle adjacent to said driven sprocket, the swing arm having a distal end portion remote from said driven sprocket;

an intermediate axle rotatably mounted on the swing arm distal end portion;

an intermediate sprocket mounted on the intermediate axle in registration with said driven sprocket;

a drive chain rotatably coupling the driven and intermediate sprockets;

a reversing wheel assembly mounted to turn with the intermediate axle, said assembly having a driven pulley and an adjacent drive drum;

a drive shaft having a drive wheel assembly mounted thereon spaced from the intermediate axle, said drive wheel assembly having a drive pulley located in registration with said driven pulley and an adjacent drive wheel in registration with said driven drum;

a V-belt coupling the drive and driven pulleys; and means for moving the drive wheel assembly and the reversing wheel assembly toward and away from each other between a first position wherein the V-belt is tensioned between the drive and driven pulleys and the drive wheel and driven drum are disengaged, and a second position wherein the V-belt is loose and the drive wheel and driven drum are engaged.

12. A reversing drive as claimed in claim 11 wherein the drive shaft is fixed in position and wherein the means for moving the drive wheel assembly and the reversing wheel assembly toward and away from each other is means for pivoting the swing arm about the main axle.

13. A reversing drive as claimed in claim 12 wherein the means for pivoting the swing arm is a shift rod operably connected to the distal end portion of the swing arm.

14. A reversing drive as claimed in claim 11 wherein the means for pivoting the swing arm is a shift rod operably connected to the distal end portion of the swing arm, and wherein said shift rod connection to the-distal end portion of the swing arm includes a pair of back-to-back compression springs mounted on the shift rod, and further comprising a bracket located between the compression springs and attached to said distal end portion.

15. A reversing drive as claimed in claim 11 wherein the means for pivoting the swing arm is a shift rod operably connected to the distal end portion of the swing arm, and wherein said shift rod connection to the distal end portion of the swing arm includes a pair of back-to-back compression springs mounted on the shift rod, and further comprising a bracket located between the compression springs and attached to said distal end portion.

16. An all terrain vehicle comprising:

an elongate chassis having parallel, spaced-apart sides; a plurality of wheels mounted on each side of the vehicle; means operably connecting the wheels on each side of the vehicle for simultaneous rotation thereof; a reversing drive as claimed in claim 1 operably coupled to one of the wheels on each side of the vehicle; and a variable speed power source connected to the drive shaft of each reversing drive.

17. An all terrain vehicle as claimed in claim 16 wherein the means for pivoting the swing arms is a shift rod operably coupled to the distal end portion of each swing arm, and further comprising a control handle coupled to each shift rod for reciprocating movement thereof.

18. An all terrain vehicle as claimed in claim 16 and further comprising a brake mounted on the each swing arm; and a brake lever operably coupled to each brake.

19. An all terrain vehicle as claimed in claim 18 wherein the means for pivoting the swing arms is a shift rod operably coupled to the distal end portion of each swing arm, and further comprising a control handle coupled to each shift rod for reciprocating movement thereof; a brake mounted on each swing arm; and a brake lever operably coupled to each brake, said control handle and brake lever being combined into one hand control for each reversing drive.

20. An all terrain vehicle as claimed in claim 18 wherein said brake is mounted to engage the wheel assembly on the side of the swing arm adjacent to the drive wheel assembly.

* * * * *